(12) United States Patent
Hoffmann

(10) Patent No.: US 8,038,870 B2
(45) Date of Patent: Oct. 18, 2011

(54) CENTRIFUGES WITH ROTATING FEED PIPES

(75) Inventor: Jeffrey R. Hoffmann, Fairfield, OH (US)

(73) Assignee: The Western States Machine Company, Hamilton, OH (US)

( * ) Notice: Subject to any disclaimer, the term of this patent is extended or adjusted under 35 U.S.C. 154(b) by 539 days.

(21) Appl. No.: 12/207,001

(22) Filed: Sep. 9, 2008

(65) Prior Publication Data

US 2010/0059458 A1    Mar. 11, 2010

(51) Int. Cl.
*B01D 17/12* (2006.01)
*B01D 17/038* (2006.01)

(52) U.S. Cl. ......... 210/86; 210/97; 210/143; 210/360.1; 494/1; 494/5; 494/10; 494/36

(58) Field of Classification Search ............ 210/85, 210/86, 94, 107, 143, 145, 360, 1, 372, 374, 210/739, 744, 781; 494/1, 3, 5, 7, 10, 11, 494/36, 37, 50, 56
See application file for complete search history.

(56) References Cited

U.S. PATENT DOCUMENTS

| | | | | |
|---|---|---|---|---|
| 4,014,498 A | * | 3/1977 | Broadwell et al. | 494/3 |
| 4,297,210 A | * | 10/1981 | Delfosse | 210/107 |
| 4,334,647 A | | 6/1982 | Taylor | |
| 4,432,748 A | * | 2/1984 | Novoselac et al. | 494/2 |
| 4,594,166 A | * | 6/1986 | Clinton et al. | 210/107 |
| 5,948,271 A | * | 9/1999 | Wardwell et al. | 210/739 |
| 6,063,292 A | * | 5/2000 | Leung | 210/739 |
| 6,296,774 B1 | * | 10/2001 | Henkel et al. | 210/744 |
| 6,749,552 B1 | | 6/2004 | Figgener et al. | |
| 2005/0107236 A1 | | 5/2005 | Gillengerten et al. | |

* cited by examiner

*Primary Examiner* — Joseph Drodge
(74) *Attorney, Agent, or Firm* — Dinsmore & Shohl LLP

(57) ABSTRACT

A centrifuge includes a rotational mechanism, a housing, a rotating feed pipe and a basket. The housing includes at least one side and defines an interior volume. The basket is positioned in the interior volume of the housing and is operatively coupled to the rotational mechanism such that rotation of the rotational mechanism is imparted to the basket. The rotating feed pipe extends into the basket through a pipe support positioned over the basket. The rotating feed pipe includes a nozzle operable to direct a flow of liquids, solids or combinations thereof onto a sidewall of the basket. The rotating feed pipe is operable to rotate from a first position towards a second position thereby increasing the distance between the nozzle and the sidewall and varying an angular orientation of the nozzle with respect to a normal to the sidewall.

17 Claims, 4 Drawing Sheets

CENTRIFUGES WITH ROTATING FEED PIPES

TECHNICAL FIELD

The present invention generally relates to centrifuges and, more specifically, to centrifuges with rotating feed pipes whereby the rotation of the feed pipe prevents the feed pipe from contacting cake deposited on the sidewall of the centrifuge.

BACKGROUND

Centrifuges, for example, basket centrifuges, are commonly used to separate solid particulates from the liquid portion of a slurry and thereby form a cake of the solid particulates on the wall of the centrifuge. The centrifuges generally comprise a rotating perforated cylinder or basket. A filter cloth lines the interior of the cylinder. As the cylinder is rotated, a feed pipe is used to direct a flow of slurry onto the interior wall of the cylinder. The centrifugal force generated by the rotation of the cylinder separates the liquid portion of the slurry from the solid particulates, expelling the liquid from the cylinder and depositing the solid particulates on the filter cloth thereby forming a cake of solid particulates on the interior wall of the centrifuge.

The feed pipe, specifically the nozzle of the feed pipe, is generally spaced apart from the interior wall of the cylinder such that the cake may be deposited between the interior wall and the nozzle. However, if the flow rate or feed pressure of the slurry is low, the slurry exiting the nozzle may not reach the interior wall of the cylinder and, instead, may fall to the bottom of the cylinder causing the cake to be deposited on and build from the bottom of the cylinder. When the cake builds from the bottom of the cylinder, the filtering efficiency of the centrifuge is reduced. The cylinder may also become unbalanced which may result in damage to the centrifuge.

To prevent the slurry from falling to the bottom of the cylinder the feed pipe may be moved closer to the interior wall. However, when the feed pipe is moved closer to the interior wall of the cylinder, the nozzle of the feed pipe and/or the feed pipe may mechanically contact the cake as the thickness of the cake increases during operation of the centrifuge. Accordingly, the cakes formed may be thinner resulting in production inefficiencies. Further, moving the feed pipe closer to the interior wall of the cylinder may result in the feed pipe interfering with other components of the centrifuge.

Accordingly, a need exists for alternative centrifuges for forming cakes of solid particulates from a slurry.

SUMMARY

In one embodiment, a centrifuge for forming a cake of solid particulates from a slurry includes a housing, a rotational mechanism, a basket and a rotating feed pipe. The housing may include at least one side and defines an interior volume. The basket can be positioned in the interior volume of the housing and operatively coupled to the rotational mechanism such that rotation of the rotational mechanism is imparted to the basket. The rotating feed pipe may extend into the basket through a pipe support positioned over the basket. The rotating feed pipe includes a nozzle operable to direct a flow of liquids, solids or combinations thereof onto a sidewall of the basket. The rotating feed pipe may be operable to rotate from a first position towards a second position thereby increasing the distance between the nozzle and the sidewall and varying an angular orientation of the nozzle with respect to a normal to the sidewall.

In another embodiment, a centrifuge for forming a cake of solid particulates from a slurry includes a housing, a rotational mechanism, a basket and a rotating feed pipe. The housing may include at least one side and defines an interior volume. The basket can be positioned in the interior volume of the housing and operatively coupled to the rotational mechanism such that rotation of the rotational mechanism is imparted to the basket. The rotating feed pipe may extend into the basket through a pipe support positioned over the basket. The rotating feed pipe includes a nozzle operable to direct a flow of liquids, solids or combinations thereof onto a sidewall of the basket. The rotating feed pipe may be operable to rotate from a first position towards a second position thereby increasing the distance between the nozzle and the sidewall and varying an angular orientation of the nozzle with respect to a normal to the sidewall. The actuator may be mechanically coupled to the rotating feed pipe and operable to rotate the rotating feed pipe in the pipe support. The programmable logic controller may be operatively coupled to the actuator and configured to trigger the actuator to rotate the rotating feed pipe from the first position towards the second position and thereby control the rotation of the rotating feed pipe in the pipe support and the angular orientation of the nozzle.

In yet another embodiment, a method for forming a cake of solid particulates from a slurry with a centrifuge comprising a basket and a rotating feed pipe extending into the basket includes rotating the basket of the centrifuge as a slurry is directed onto a sidewall of the basket with a nozzle of the rotating feed pipe to form a cake of solid particulates on the sidewall. The rotating feed pipe may be rotated from the first position towards the second position as the thickness of the cake of solid particulates increases, thereby increasing the distance between the nozzle and the sidewall and varying an angular orientation of the nozzle with respect to a normal to the sidewall.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1A:
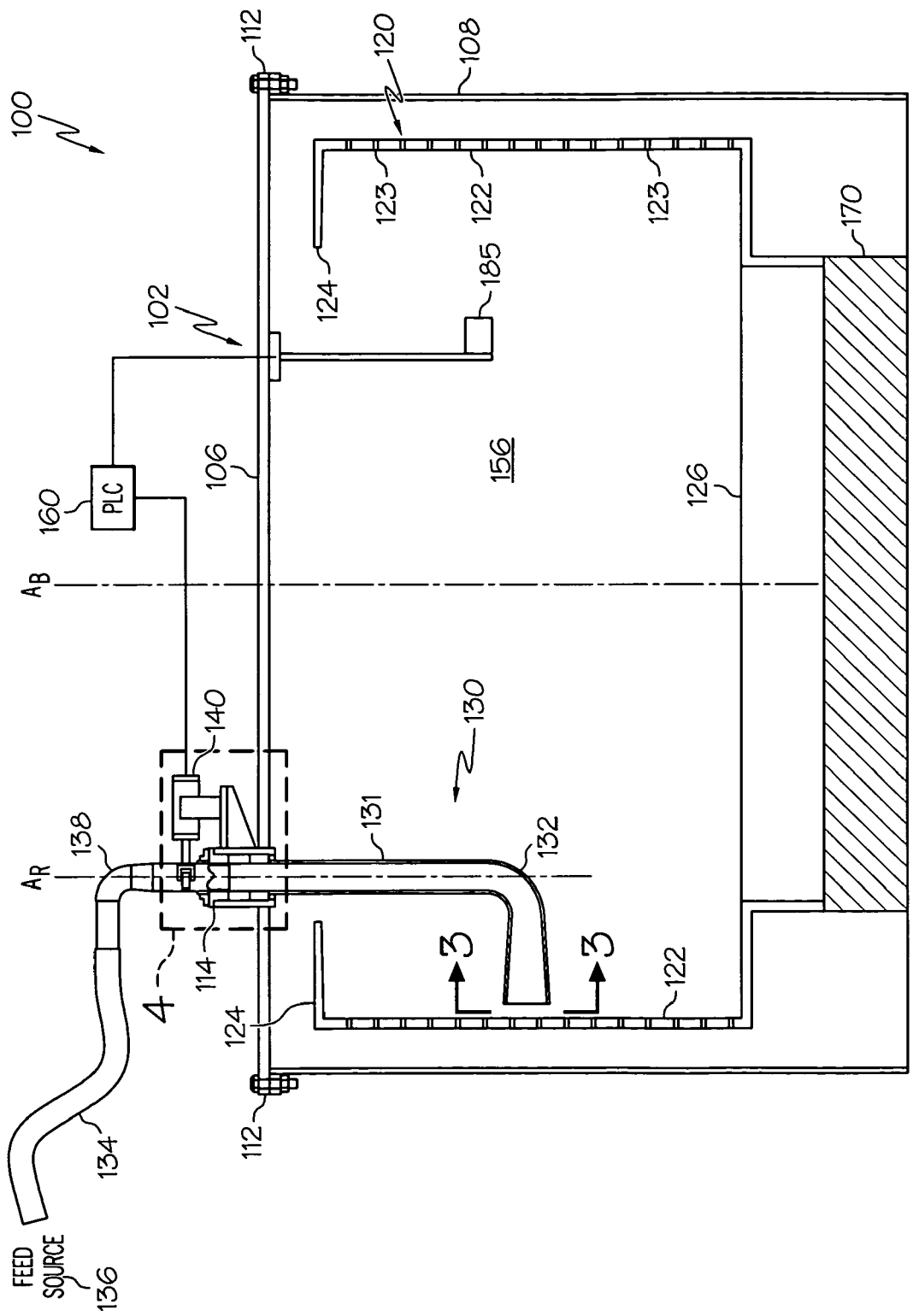
FIG. 1A depicts a cross section of a centrifuge with a rotating feed pipe with the rotating feed pipe in a first position according to one or more embodiments shown and described herein.

FIG. 1A shows one embodiment of a centrifuge for forming a solid cake from solid particulates suspended in a slurry. The centrifuge generally comprises a basket, a rotational mechanism, a housing and a rotating feed pipe. Rotation of the rotating feed pipe prevents the rotating feed pipe from contacting the cake deposited on the sidewall of the basket during and after formation of the cake. Rotation of the rotating feed pipe also prevents the feed pipe from interfering with other components of the centrifuge during insertion or removal of the basket. The various components of the centrifuge and the operation of the centrifuge will be described in more detail herein.

Referring to FIG. 1A, a centrifuge 100 is depicted according to one or more embodiments described herein. The centrifuge 100 comprises a basket 120, a rotational mechanism 170, a housing 102 and a rotating feed pipe 130. The basket 120 may be generally cylindrical in shape having a sidewall 122 and a bottom 126 defining an interior volume 156. In one embodiment, the sidewall 122 of the basket 120 may comprise a solid material (e.g., a metal such as stainless steel) having a plurality of openings 123 passing through the sidewall 122 such that the sidewall is perforated permitting liquid to escape from the interior volume 156 of the basket 120 as the basket 120 is rotated. In another embodiment, the sidewall 122 of the basket 120 may comprise a rigid mesh with a regular pattern of interstices extending through the mesh such that liquid in the interior volume 156 of the basket 120 may escape from the basket 120 as the basket is rotated. As shown in FIG. 1A, the basket 120 may have an axis of rotation $A_B$.

The basket 120 may further comprise a top cap 124 located atop the basket 120 and extending radially inward from the sidewall 122. The top cap 124 may have an open center such that the top cap 124 is generally annular in shape. In one embodiment, the top cap 124 may be substantially parallel with the bottom 126 of the basket 120. However, it should be understood that the top cap may have various other orientations with respect to the bottom 126 of the basket 120.

The basket 120, specifically the sidewalls 122 of the basket 120, may be lined with a filter cloth (not shown) such that, as the basket is rotated, the liquid passes through the filter cloth and any solid particulates entrained or suspended in the liquid are retained on the filter cloth on the sidewall 122 of the basket 120 as the liquid is expelled from the basket 120.

In order to facilitate the rotation of the basket 120 about the axis of rotation $A_B$, the basket 120 may be mechanically coupled to a rotational mechanism 170 such that rotation of the rotational mechanism 170 is imparted to the basket 120. In one embodiment, the bottom 126 of the basket 120 is secured to a spindle (not shown) of the rotational mechanism 170. The spindle may be rotationally coupled to an armature of a motor (not shown) located in the rotational mechanism 170 with belts, pulleys or the like, such that the rotation of the armature is conveyed to the spindle and, in turn, the basket 120. However, it should be understood that any suitable mechanism may be used to facilitate rotation of the basket and, as such, no specific limitation is intended as to the rotational mechanism used to impart rotation to the basket.

The centrifuge 100 may also comprise a housing 102 which encloses the basket 120 and the rotational mechanism 170 and confines the liquid expelled from the basket 120. The housing 102 may be cylindrical in shape and generally comprise a sidewall 108 and a lid 106. The lid 106 may be releasably fastened to the sidewall 108 using bolts 122. However, it should be understood that other closure mechanisms may be used to secure the lid 106 to the sidewall 108 of the enclosure 102 such as latches, hinges and/or combinations thereof. Further, is should also be understood that, while the centrifuge 100 depicted in FIG. 1A is shown with a lid 106, the centrifuge 100 may also be used without a lid 106, particularly when the basket 120 comprises a top cap 124.

Figure 2B:
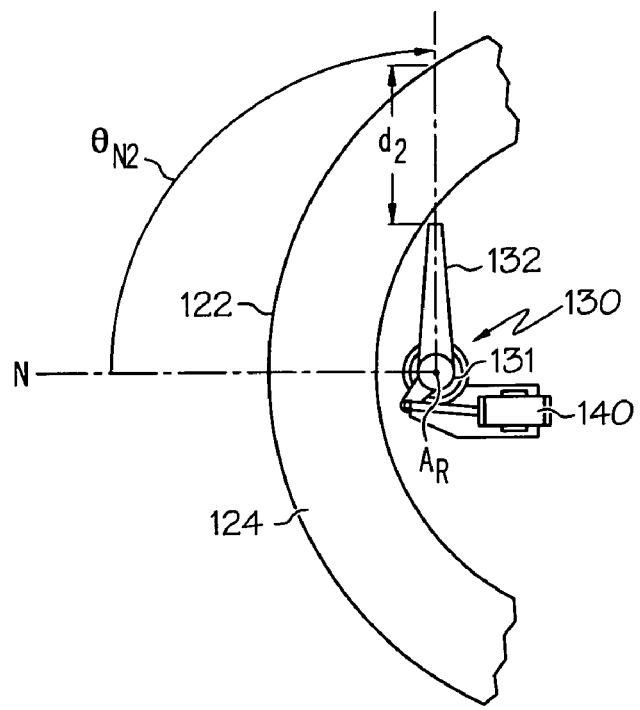
FIG. 2B depicts a top view of a portion of the centrifuge depicted in FIG. 2A showing a portion of the basket of the centrifuge with the nozzle of the rotating feed pipe in a second position such that the nozzle does not mechanically contact the top cap of the basket according to one or more embodiments shown and described herein.
Figure 2A:
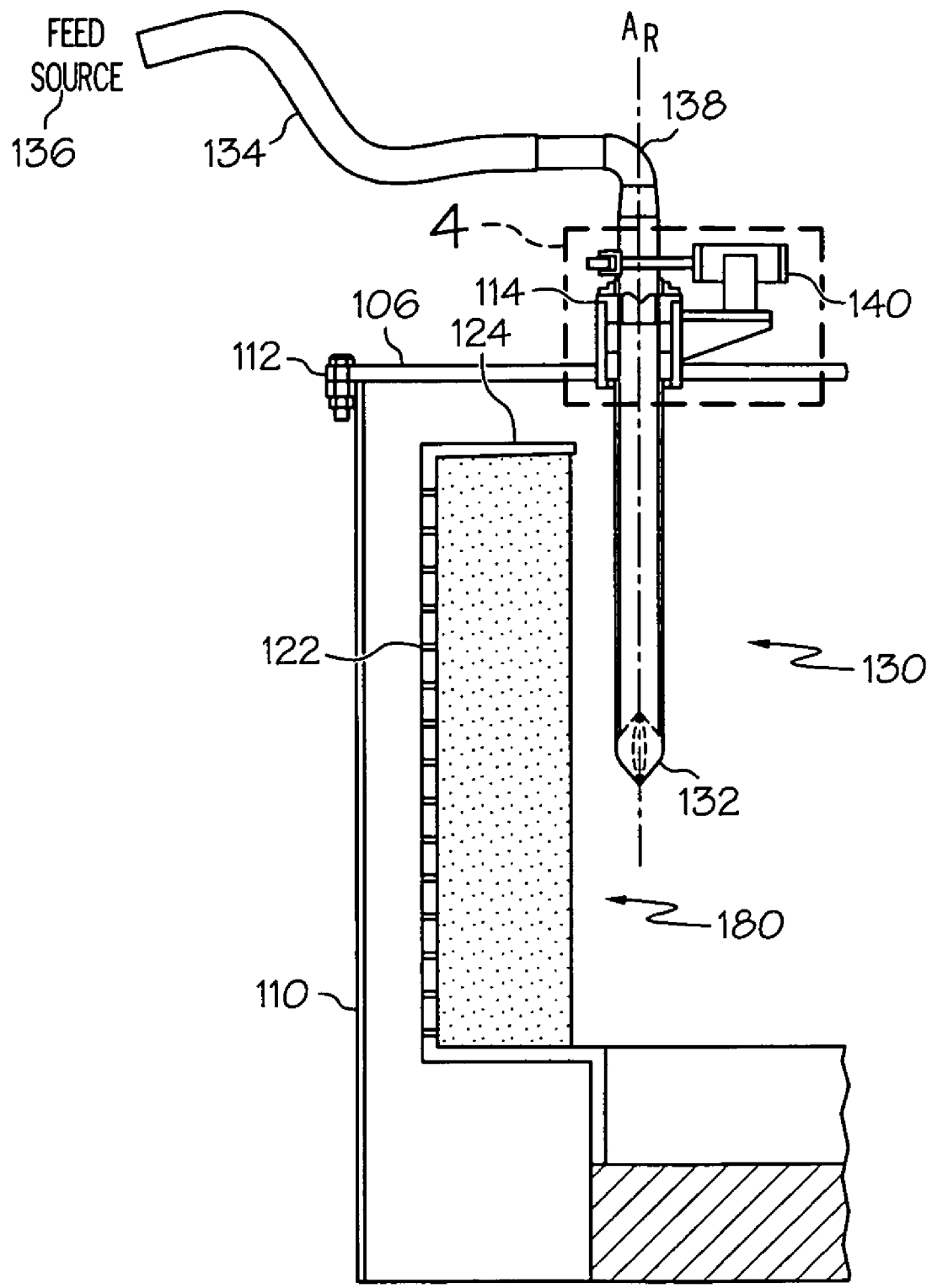
FIG. 2A depicts a partial cross section of the centrifuge of FIG. 1A with a cake deposited on the sidewall of the basket and the rotating feed pipe in a second position such that the rotating feed pipe does not contact the deposited cake according to one or more embodiments shown and described herein.

Referring now to FIGS. 1A and 2A, the centrifuge 100 may also comprise a rotating feed pipe 130 which passes through the lid 106 and into the interior volume 156 of the basket 120. The rotating feed pipe 130 generally comprises a pipe 131 with a nozzle 132 extending from the end of the pipe 131 positioned in the interior volume of the basket 120. The nozzle 132 may be integrally formed with the pipe 131 or attached to the pipe 131. The nozzle 132 may be configured to direct liquid flowing through the pipe 131 onto the sidewall 122 of the basket 120. In the embodiment shown, the nozzle 132 is oriented at approximately 90° to the axis of rotation $A_R$ of the rotating feed pipe 130. However, it should be understood that various other orientations of the nozzle 132 relative to the pipe 131 may be used to facilitate directing liquid from the pipe 131 onto the sidewall 122 of the basket 120. Accordingly, no particular limitation is intended as to the orientation of the nozzle 132 to the pipe 131 of the rotating feed pipe 130.

Figure 1B:
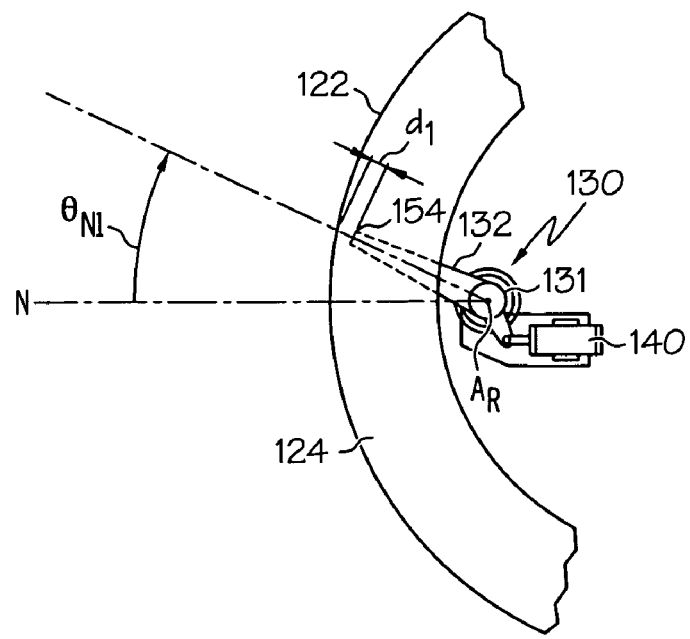
FIG. 1B depicts a top view of a portion of the centrifuge of FIG. 1A showing a portion of the basket of the centrifuge with the nozzle of the rotating feed pipe in a first position.
Figure 3:
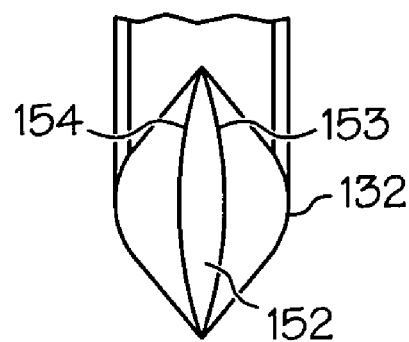
FIG. 3 depicts the nozzle outlet of the nozzle of the rotating feed pipe according to one or more embodiments shown and described herein.

In one embodiment, the nozzle 132 of the rotating feed pipe 130 may be tapered outwardly (as shown in FIG. 1B) and comprise a substantially circular nozzle outlet. In another embodiment, the nozzle 132 may be tapered outwardly (as shown in FIG. 1B) and the nozzle outlet 152 may be substantially elliptical, as shown in FIG. 3. The combination of the tapered nozzle 132 with the elliptical nozzle outlet 152 reduces the distance between a distal edge 154 of the nozzle outlet 152 and the sidewall 122 of the basket 120 as the rotating feed pipe 130 and nozzle 132 are rotated about the axis of rotation $A_R$ away from perpendicularity with the sidewall 122 of the basket 120. The reduced distance between the sidewall 122 and the elliptical nozzle outlet 152 assists in maintaining the nominal distance between the nozzle outlet 152 and the sidewall 122 of the basket 120 and thereby assists in maintaining a uniform distribution of the liquid directed onto the sidewall 122 of the basket 120 as the rotating feed pipe 130 and nozzle 132 are rotated relative to the sidewall 122 of the basket 120.

The rotating feed pipe 130 may be fluidly coupled to a feed source 136 such that liquid from the feed source 136 may flow from the feed source 136, through the rotating feed pipe 130 and into the interior volume 156 of the basket 120. In one embodiment, as shown in FIG. 1, the rotating feed pipe 130 is fluidly coupled to the feed source 136 via an angled coupling 138 and a flexible hose 134 such that the rotating feed pipe 130 may be rotated relative to the pipe support 114. In another embodiment (not shown), the rotating feed pipe 130 may be fluidly coupled to the feed source 136 with a rotary coupling, such as a rotary union, such that the rotating feed pipe 130 is free to rotate with respect to the pipe support 114.

Figure 4:
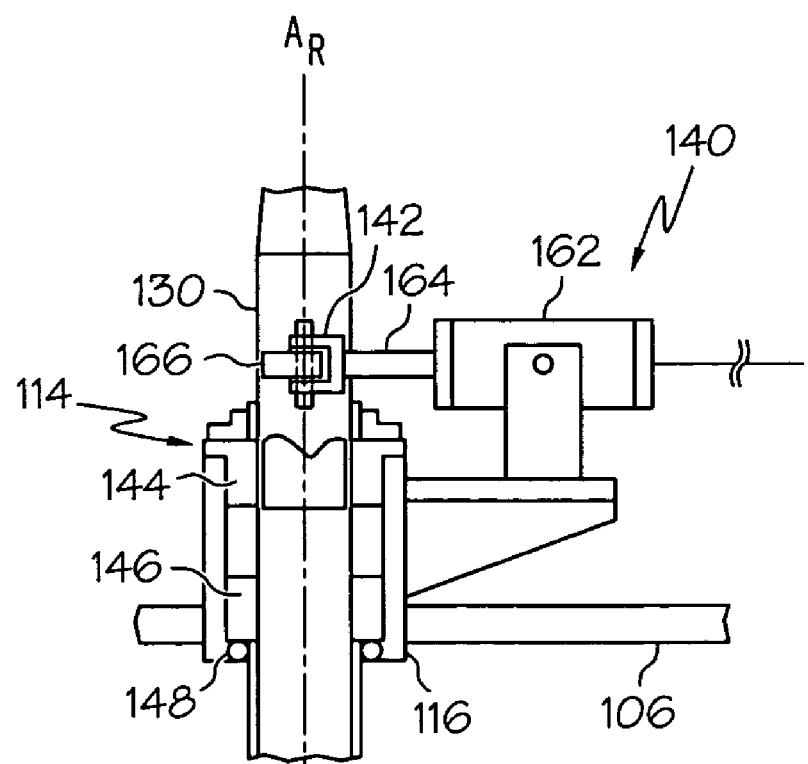
FIG. 4 depicts a close up of the pipe support of the centrifuge according to one or more embodiments shown and described herein.

Referring now to FIGS. 1A, 2A and 4, to facilitate rotation of the rotating feed pipe 130 and nozzle 132 relative to the basket 120 and, more specifically, relative to the sidewall 122 of the basket 120, the rotating feed pipe 130 may be positioned in a pipe support 114. In the embodiments shown herein, the pipe support 114 is positioned in the lid 106 of the housing 102. The pipe support 114 is positioned such that the axis of rotation $A_R$ of the rotating feed pipe is generally not coaxial with the axis of rotation $A_B$ of the basket 120 but is, instead, located off-axis, towards the sidewall 122 of the basket 120 thereby reducing the distance between the nozzle 132 and the sidewall 122 of the basket 120.

The pipe support 114 may generally comprise a conduit 116 extending through the lid 106 of the housing 102. The pipe 131 of the rotating feed pipe 130 may be positioned in the conduit 116 and supported and stabilized in the conduit 116 with bushings 144, 146. The bushings 144, 146 facilitate the rotation of the rotating feed pipe 130 with respect to the conduit 116 and the basket 120. A seal 148 may be positioned at the lower end of the conduit 116 to prevent contamination of the pipe support 114. The seal 148 also permits the interior of the housing 102 to be pressurized or placed under vacuum as needed.

While FIGS. 1A, 2A and 4 depict the pipe support 114 as extending through the lid 106 of the housing 102, it should be understood that the pipe support 114 may be separate from the housing 102. For example, in another embodiment (not shown), the pipe support 114 may be separate from the housing 102 and disposed over the basket 120. The rotating feed pipe 130 may extend from the pipe support 114, through the lid 106 of the housing 102 and into the interior volume 156 of the basket 120.

As noted herein, the pipe support 114 facilitates rotation of the rotating feed pipe 130 relative to the sidewall 122 of the basket 120. Rotating the feed pipe 130 compensates for the decrease in distance between the nozzle 132 and the cake 180 formed on the sidewall 122 during operation of the centrifuge 100. The rotation of the rotating feed pipe 130 relative to the sidewall 122 of the basket 120 will be explained in more detail with specific reference to FIGS. 1B and 2B.

Referring now to FIGS. 1B and 2B, a top view of the nozzle 132 of the rotating feed pipe 130 is shown with respect to a portion of the sidewall 122 and top cap 124 of the basket 120. In FIG. 1B the rotating feed pipe 130 is shown in a first position such that the nozzle 132 is oriented at approximately 20° to a normal N to the sidewall 122 of the basket 120 (e.g., $\theta_{N1}$=20°). The normal N to the sidewall of the basket, as used herein, refers to the normal to the sidewall of the basket which passes through the axis of rotation $A_R$ of the rotating feed pipe 130 and the axis of rotation $A_B$ of the basket 120. When the rotating feed pipe 130 is in the first position, the nozzle 132 is separated from the sidewall 122 by a distance $d_1$. FIG. 2B shows the rotating feed pipe 130 in a second position such that the nozzle 132 is oriented at approximately 90° to the normal to the sidewall 122 of the basket 120 (e.g., $\theta_{N2}$=70°). When the rotating feed pipe 130 is in the second position, the distance $d_2$ between the nozzle 132 and the sidewall 122 of the basket 120 is increased such that $d_2 > d_1$. Accordingly, as the rotating feed pipe 130 is rotated about the axis $A_R$ from the first position to the second position, the distance between the nozzle 132 and the sidewall 122 increases. The increase in distance between the nozzle 132 and the sidewall 122 through the rotation of the feed pipe 130 may be used to compensate for the build-up of the solids on the interior of the sidewall 122 and thereby prevent the nozzle 132 from contacting the cake and vice-versa. By adjusting the angular orientation of the nozzle relative to the sidewall 122 of the basket 120 by rotating the rotating feed pipe 130 from a first position to a second position, the nominal distance between the nozzle and the deposited cake may also be maintained throughout cake deposition.

It should be understood that, while FIG. 1B depicts the first position of the rotating feed pipe such that the angle $\theta_{N1}$ between the nozzle 132 and the normal N to the sidewall 122 is about 20°, the angle $\theta_{N1}$ between the nozzle 132 and the normal to the sidewall 122 may be any angle less than about 90°.

Further, when the basket 120 comprises a top cap 124, rotation of the rotating feed pipe 130 from the first position to the second position rotates the nozzle 132 out from under the top cap 124, as depicted in FIG. 2B. This permits the rotating feed pipe 130 to be withdrawn from the basket 120 without the nozzle mechanically contacting either the deposited cake on the sidewall 122 of the basket 120 or the top cap 124 of the basket 120.

Referring again to FIGS. 1A, 2A and 4, the centrifuge 100 may comprise an actuator 140 mechanically coupled to the rotating feed pipe 130 to rotate the rotating feed pipe 130 in the pipe support 114. The actuator 140 may be a linear actuator, such as a pneumatic actuator, a hydraulic actuator or an electromechanical actuator, mechanically coupled to the rotating feed pipe 130. The linear motion of the actuator 140 rotates the rotating feed pipe 130 in the pipe support 114. In the embodiment shown in FIG. 4, the actuator 140 is a pneumatic actuator comprising a piston 164 disposed in a cylinder 162. The cylinder 162 may be fixed to the pipe support 114 and the piston 164 may be pivotally coupled to a tab 166 on the rotating feed pipe 130 with a pivoting connector 142, such as a clevis and pin or similar connector, such that the linear motion of the piston 164 rotates the rotating feed pipe 130 in the pipe support 114. More specifically, as the piston 164 extends from the cylinder 162, the rotating feed pipe 164 is rotated in a first direction and, as the piston 164 is retracted into the cylinder 162, the rotating feed pipe 130 is rotated in a second direction which is opposite the first direction.

The actuator 140 may be operatively connected to a programmable logic controller (PLC) 160 operable to control the rotational motion of the rotating feed pipe 130 relative to the pipe support 114 and sidewall 122 of the basket 120. When the actuator 140 is a pneumatic actuator, as described above, the PLC 160 may be operable to regulate the flow of compressed air to the actuator 140 and thereby control the extension and retraction of the piston 164 relative to the cylinder 162 and, accordingly the rotation of the rotating feed pipe 130 in the pipe support 114.

In one embodiment, the PLC 160 may be programmed to rotate the rotating feed pipe 130 from the first position towards the second position at a predetermined rate based on the deposition rate of the cake being deposited on the sidewalls of the basket.

In another embodiment, the centrifuge 100 may further comprise a sensor 185 for determining the thickness of the cake deposited on the sidewall 122 of the basket 120. The sensor 185 may comprise an ultrasonic sensor, an optical sensor, a mechanical sensor or a similar sensor operable to measure distance. In the embodiment shown in FIG. 1A, the sensor 185 is an ultrasonic sensor. The sensor 185 may be disposed in the interior volume 156 of the basket 120 and positioned to measure the distance between the sensor and the sidewall 122 or the distance to the cake deposited on the sidewall. For example, in the embodiment shown in FIG. 1A, the sensor 185 is positioned in the interior volume 156 of the basket 120 and directed towards the sidewall 122 of the basket 120. As such, the sensor may be used to determine the thickness of the cake deposited on the sidewall. The sensor 185 may be electrically coupled to the PLC 160 and the sensor 185 may be operable to send an electrical signal to the PLC 160 indicative of the distance to the sidewall 122 or the cake deposited on the sidewall 122 of the basket 120. The PLC 160 may be programmed to trigger the actuator 140 based on the signal received from the sensor 185 and thereby rotate the rotating feed pipe 130 from a first position proximate the sidewall towards a second position away from the sidewall 120 such that the nominal distance between the nozzle 132 and the cake 180 is maintained as the cake is deposited on the sidewall 122 and increases in thickness.

The operation of the centrifuge will now be explained in detail with reference to FIGS. 1A-2B. In order to form a cake 180 of solids on the sidewall 122 of the basket 120, the rotating feed pipe 130 is rotated into a first position such that the nozzle 132 is proximate the sidewall 122 of the basket 120 such that the nozzle outlet 152 is nominally about 1 inch from the sidewall 122. In one embodiment, when the rotating feed pipe 130 is in the first position, the angle $\theta_{N1}$ between the feed pipe and the normal N to the sidewall 122 of the basket is 0°. In another embodiment, when the rotating feed pipe 130 is in the first position, the angle $\theta_{N1}$ between the feed pipe and the normal N to the sidewall 122 of the basket is 20°, as depicted in FIG. 1B. In this embodiment, the distance between the nozzle outlet 152 and the sidewall 122 is measured from a point on an edge 153, 154 of the nozzle outlet 152 closest to the sidewall 122.

Once the rotating feed pipe 130 is in the first position, the basket 120 is rotated about the axis $A_B$ with the rotational mechanism 170. As the basket 120 rotates, a slurry of solid particulates suspended in a liquid is pumped or otherwise permitted to flow from the feed source 136 and through the pipe 131 and nozzle 132 of the rotating feed pipe 130. The nozzle 132 of the rotating feed pipe 130 directs the slurry onto the sidewall 122 and, more specifically, onto a filter cloth (not shown) positioned on the sidewall 122. As the basket 120 rotates, the centrifugal force spreads the slurry over the sidewall 122 and draws the liquid portion of the slurry through the filter cloth and out of the openings 123 in the sidewall 122 of the basket 120 thereby depositing the solid particulates on the filter cloth. As the deposition of the solid particulates progresses, a cake 180 of solid particulates begins to form on the sidewall 122 of the basket 120.

As the thickness of the cake 180 on the sidewall 122 increases, the distance between the cake 180 and the nozzle 132 decreases. The increase in the thickness of the cake 180 may be detected by the sensor 185 which provides a signal to the PLC 160 indicative of the distance to the cake and, therefore, the increase in thickness of the cake 180. In one embodiment, based on this signal, the PLC 160 may be programmed to incrementally rotate the rotating feed pipe 130 from the first position towards the second position by triggering the actuator 140 such that the nominal distance between the nozzle 132 and the cake 180 is maintained as the cake 180 is deposited on the sidewall 122.

In another embodiment, the PLC 160 may be programmed to calculate the separation between the nozzle 132 and the cake 180 based on the signal received from the sensor 185 and the position of the piston in the cylinder of the actuator 140. If the calculated distance is less than the nominal distance, the PLC 160 may be programmed to trigger the actuator to rotate incrementally the rotating feed pipe 130 in the pipe support 114 in a direction towards the second position such that the nominal distance between the nozzle 132 and the cake 180 is restored and maintained. If the calculated distance is greater than the nominal distance, the PLC 160 may be programmed to trigger the actuator and thereby rotate the rotating feed pipe 130 in a direction towards the first position (e.g., towards the initial position of the nozzle) such that the nominal distance between the nozzle 132 and the cake 180 is restored and maintained.

In either embodiment, as the cake 180 is deposited on the sidewall 122, the position of the nozzle 132 relative to the cake 180 is continuously adjusted by rotating the rotating feed pipe 130 in the pipe support based on the thickness of the deposited cake 180.

In yet another embodiment, when the centrifuge 100 does not comprise a sensor, the PLC 160 may be programmed to rotate the rotating feed pipe 130 from the first position to the second position at a predetermined rate based on the rate at which the cake is deposited on the sidewall 122 of the basket. The cake deposition rate may be determined from the speed of rotation of the basket, the composition of the slurry and the flow rate of the slurry from the feed source 136. Using this information, the rotational rate of the rotating feed pipe 130 may be determined such that the nominal distance between the nozzle 132 and the cake is maintained throughout the cake deposition process.

Once the cake 180 is deposited, the nozzle may be rotated to the second position such that the rotating feed pipe may be withdrawn from the interior volume 156 of the basket 120 without contacting the cake 180 or the top cap 124 of the basket.

It should now be understood that the centrifuge with a rotating feed pipe described herein may be used to form a cake of solid particulates from a slurry comprising solid particulates and liquid. The centrifuge with a rotating feed pipe is particularly useful for forming a cake of solid particulates from a slurry when the viscosity, flow rate and/or feed pressure of the slurry is sufficiently low such that the feed pipe must be moved closer to the sidewall of the centrifuge basket to enable the deposition of the slurry on the sidewall of the basket.

For the purposes of describing and defining the present invention it is noted that the terms "substantially" or "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A centrifuge comprising a housing, a rotational mechanism, a basket, a rotating feed pipe and a programmable logic controller, wherein:
   the housing comprises at least one side and defines an interior volume;
   the basket is positioned in the interior volume of the housing and operatively coupled to the rotational mechanism such that rotation of the rotational mechanism is imparted to the basket;
   the rotating feed pipe extends into the basket through a pipe support positioned over the basket or through a basket lid or cap, wherein the rotating feed pipe comprises a nozzle operable to direct a slurry of solid particulates suspended in a liquid onto a sidewall of the basket and the rotating feed pipe is operable to rotate in the pipe support from a first position towards a second position thereby increasing the distance between the nozzle and the sidewall and varying an angular orientation of the nozzle with respect to the sidewall as a cake deposits on the sidewall of the basket, and the programmable logic controller being programmed to rotate the feed pipe at a predetermined rate based on the deposition rate of the cake.

2. The centrifuge of claim 1 wherein an axis of rotation of the rotating feed pipe is non-coaxial with an axis of rotation of the basket.

3. The centrifuge of claim 1 wherein the rotating feed pipe is operable to rotate up to about 90°.

4. The centrifuge of claim 1 wherein, when the rotating feed pipe is in the first position, the nozzle has an angular orientation of 0° degrees with respect to the normal to the sidewall of the basket.

5. The centrifuge of claim 1 wherein, when the rotating feed pipe is in the first position, the nozzle has an angular orientation of 20° degrees with respect to the normal to the sidewall of the basket.

6. The centrifuge of claim 1 wherein, when the rotating feed pipe is in the second position, the nozzle has an angular orientation of 90 degrees with respect to the normal to the sidewall of the basket.

7. The centrifuge of claim 1 wherein the nozzle is tapered outwardly and comprises an elliptical nozzle outlet.

8. The vertical filtering centrifuge of claim 1 wherein the rotating feed pipe is fluidly coupled to a feed source.

9. A centrifuge comprising a housing, a rotational mechanism, a basket, a rotating feed pipe, an actuator and a programmable logic controller, wherein:

the housing encloses the rotational mechanism and comprises at least one side defining an interior volume;

the basket is positioned in the interior volume of the housing and operatively coupled to the rotational mechanism such that rotation of the rotational mechanism is imparted to the basket;

the rotating feed pipe extends into the basket through a pipe support positioned over the basket or through a basket lid or cap, wherein the rotating feed pipe comprises a nozzle operable to direct a slurry of particulates suspended in a liquid onto a sidewall of the basket and the rotating feed pipe is operable to rotate from a first position towards a second position thereby increasing the distance between the nozzle and the sidewall and varying an angular orientation of the nozzle with respect to the sidewall as a cake is deposited on the sidewall of the basket;

the actuator is mechanically coupled to the rotating feed pipe and operable to rotate the rotating feed pipe in the pipe support; and the programmable logic controller is operatively coupled to the actuator and configured to trigger the actuator to rotate the rotating feed pipe in the pipe support from the first position towards the second position and thereby control the rotation of the rotating feed pipe in the pipe support and the angular orientation of the nozzle based on the deposition rate of the cake on the sidewall of the basket.

10. The centrifuge of claim 9 wherein the actuator is a linear actuator selected from the group consisting of pneumatic actuators, electromechanical actuators and hydraulic actuators.

11. The centrifuge of claim 9 further comprising a sensor operable to detect a thickness of a cake deposited on the sidewall of the basket, wherein the sensor is configured to send electrical signals to the programmable logic controller indicative of the thickness of the cake; and the programmable logic controller is programmed to trigger the actuator based on the electrical signals received from the sensor and thereby rotate the rotating feed pipe in the pipe support and adjust the angular orientation of the nozzle relative to a normal to the sidewall of the basket.

12. The centrifuge of claim 11 wherein the sensor is selected from a group consisting of ultrasonic sensors, mechanical sensors, electromechanical sensors and optical sensors.

13. The centrifuge of claim 9 wherein the nozzle is outwardly tapered and comprises an elliptical nozzle outlet.

14. The centrifuge of claim 9 wherein the rotating feed pipe is operable to rotate up to about 90° degrees.

15. The centrifuge of claim 9 wherein the rotating feed pipe is fluidly coupled to a feed source.

16. A method for forming a cake of solid particulates from a slurry with a centrifuge comprising a basket, a programmable logic controller, and a rotating feed pipe extending into the basket through a support located over the basket or through a basket lid or cap, the method comprising:

rotating the basket of the centrifuge;

directing a slurry onto a sidewall of the basket via a nozzle of the rotating feed pipe thereby to deposit a cake of solid particulates on the sidewall; and rotating the rotating feed pipe from the first position towards the second position as the thickness of the cake of solid particulates increases and at a predetermined rate as programmed by the programmable logic controller based on the deposition rate of the cake, thereby increasing the distance between the nozzle and the sidewall and varying an angular orientation of the nozzle with respect to the sidewall.

17. A method for forming a cake of solid particulates from a slurry with a centrifuge comprising a basket, a programmable logic controller, a sensor determining a thickness of a cake deposited in the basket, and a rotating feed pipe extending into the basket through a support located over the basket or through a basket lid or cap, the method comprising:

rotating the basket of the centrifuge;

directing a slurry onto a sidewall of the basket via a nozzle of the rotating feed pipe thereby to deposit a cake of solid particulates on the sidewall;

determining a thickness of the cake with the sensor; and rotating the rotating feed pipe from the first position towards the second position as controlled by the programmable logic controller based on the thickness of the cake as the cake is deposited, wherein the distance between the nozzle and the sidewall is increased as the thickness of the cake increases and an angular orientation of the nozzle is varied with respect to the sidewall.

* * * * *